(12) United States Patent
Nagaya et al.

(10) Patent No.: US 7,665,933 B2
(45) Date of Patent: Feb. 23, 2010

(54) CUTTING INSERT

(75) Inventors: Hidehiko Nagaya, Joso (JP); Norio Aso, Joso (JP); Yasuharu Imai, Joso (JP)

(73) Assignee: Mitsubishi Materials Corporation, Tokyo (JP)

( * ) Notice: Subject to any disclaimer, the term of this patent is extended or adjusted under 35 U.S.C. 154(b) by 0 days.

(21) Appl. No.: 12/078,026

(22) Filed: Mar. 26, 2008

(65) Prior Publication Data
US 2008/0240875 A1 Oct. 2, 2008

(30) Foreign Application Priority Data
Mar. 30, 2007 (JP) ............... 2007-091952
Mar. 30, 2007 (JP) ............... 2007-094884
Jan. 23, 2008 (JP) ............... 2008-012974

(51) Int. Cl.
*B23B 27/00* (2006.01)
*B23B 27/22* (2006.01)
(52) U.S. Cl. ............ 407/116; 407/117; 407/114
(58) Field of Classification Search .......... 407/48, 407/40, 53, 103, 33, 34, 64, 110, 114, 116, 407/117, 113
See application file for complete search history.

(56) References Cited

U.S. PATENT DOCUMENTS

| 4,992,008 | A |   | 2/1991 | Pano et al. |       |
|-----------|---|---|--------|-------------|-------|
| 5,725,334 | A | * | 3/1998 | Paya        | 407/117 |
| 5,827,017 | A | * | 10/1998| Tagstrom et al. | 407/116 |
| 6,238,147 | B1| * | 5/2001 | Tagtstrom et al. | 407/117 |
| RE37,595  | E | * | 3/2002 | Lindstedt   | 407/116 |
| 6,692,199 | B2| * | 2/2004 | Andersson et al. | 407/116 |
| 6,796,752 | B2| * | 9/2004 | Tong        | 407/116 |

FOREIGN PATENT DOCUMENTS

| DE | 295 03 246 | 4/1995 |
| DE | 298 07 877 | 8/1998 |
| EP | 0 775 544  | 5/1997 |
| EP | 1375038    | 1/2004 |
| GB | 2290994    | 1/1996 |
| JP | 1-64308    | 4/1989 |
| JP | 09-174308  | 7/1997 |
| JP | 2003-011005| 1/2003 |
| JP | 2005-103655| 4/2005 |

OTHER PUBLICATIONS

European Search Report dated Jan. 14, 2009, issued on the corresponding European patent application No. 08 00 5589.0.
European Search Report dated Jan. 19, 2009, issued on the corresponding European patent application No. 08 00 5586.6.

* cited by examiner

*Primary Examiner*—Will Fridie, Jr.
(74) *Attorney, Agent, or Firm*—Edwards Angell Palmer & Dodge LLP

(57) ABSTRACT

A cutting insert having an insert body formed in a shaft-shape, wherein a cutting edge portion having a square rake face is formed on an end portion of the insert body, and wherein the rake face includes: a pair of side cutting edges extending in a longitudinal direction of the insert body; a front cutting edge extending in a transverse direction perpendicular to the longitudinal direction between each front end of the side cutting edges; a pair of protruded streaks extending toward each of corner portions at which each of the side cutting edges intersect the front cutting edge, and a projection which protrudes and is separated from the protruded streaks between front ends of the protruded streaks in the vicinity of the corner portion and the corner portion.

12 Claims, 12 Drawing Sheets

CUTTING INSERT

CROSS REFERENCE TO RELATED APPLICATIONS

This application is related to the co-pending application entitled "CUTTING INSERT" filed even date herewith in the names of Hidehiko Nagaya, Norio Aso and Yasuharu Imai; claiming priority of Japanese Patent Application No. 2007-091952, filed Mar. 30, 2007, Japanese Patent Application No. 2007-094884, filed Mar. 30, 2007, and Japanese Patent Application No. 2008-012975, filed Jan. 23, 2008; which application is assigned to the assignee of the present application.

BACKGROUND OF THE INVENTION

1. Field of the Invention

The present invention relates to a cutting insert which is used in turning operations of work materials for grooving, cutting-off, or the like.

Priority is claimed on Japanese Patent Application No. 2007-091952, filed Mar. 30, 2007, Japanese Patent Application No. 2007-094884, filed Mar. 30, 2007, and No. 2008-012974, filed Jan. 23, 2008, the contents of which are incorporated herein by reference.

2. Description of Related Art

A cutting insert for grooving, cutting-off or the like used in a turning operations is proposed, for example, in Japanese Unexamined Patent Application, First Publication No. H09-174308 (hereinafter, JP H09-174308), so as to have a pair of ridges extending substantially in a longitudinal direction on a top surface of a cutting head, a chip breaker pit which is provided between the ridges, a break line extending between a front pit and a rear pit of the chip breaker pit, and a pair of burls included and disposed in the front pit between the break line and a major cutting edge, so that the vicinity of a connecting point of the break line with the ridges thrust chips as a squeezing zone.

In the cutting insert of JP H09-174308, the pair of burls is disposed in the vicinity of inner surfaces of the ridges facing each other. Each of the ridges extends in the longitudinal direction and toward a corner portion in which a front major cutting edge (i.e. a front cutting edge) meets a side cutting edge so that the front end thereof is separated from that of the other ridge.

However, in the cutting insert of JP H09-174308, when grooving a work material by advancing the front major cutting edge in the longitudinal direction and broadening the groove width using the side cutting edge feeding in a traverse direction, whole chips generated by the side cutting edge especially at the vicinity of the corner portion are collided with the front ends stretching from the ridges. Therefore, in such a case, it is possible to increase the cutting resistance and impossible to dispose the chips smoothly owing to an accumulation of the chips.

In such grooving and cutting-off of the work material, cutting fluid (i.e. coolant) is generally supplied to a cutting portion in which a cutting edge cuts deep into the work material for lubrication and cooling. The cutting fluid is supplied toward a top surface, i.e. a rake face, of the cutting head from the rear end of the cutting insert in order to not be prevented by the chips from being supplied.

However, in the cutting insert of JP H09-174308, the ridges are formed so as to extend in the longitudinal direction so that the front ends thereof extend toward the corner portions. Therefore, the cutting fluid which is supplied to the front ends running between the ridges and the side cutting edges in the rake face is guided by the front ends of the ridges. As a result, the cutting fluid cannot be sufficiently supplied to the front major cutting edge, especially at the corner portion; therefore, damage by heat of the cutting edge at the corner portion and adhesion depending on the work material can easily occur. In addition, walls of the groove and the cut surfaces of the work material are deteriorated in accuracy and quality.

Meanwhile, when only grooving or cutting-off the work material at the front major cutting edge by advancing the cutting insert in the longitudinal direction, the chips generated by the front major cutting edge collide with and rub against the pair of burls, and move to the chip breaker pit. The burls (bosses) are worn and the height thereof becomes low, thereby disappearing if the chips continue rubbing. The tool life of the cutting insert is wasted in a short amount of time since the chips cannot be controlled owing to the abrasion of the burls; also, smooth operation is impossible since the chips cannot be controlled during a reducing process of the burls by the abrasion.

SUMMARY OF THE INVENTION

The present invention is achieved in view of the above-mentioned circumstances and has an object to provide a cutting insert which is used for the grooving and cutting-off a work material as mentioned above, in which a cutting fluid can be properly supplied to a corner portion at a front cutting edge thereby preventing damage and adhesion of the portion concerned and improving accuracy and quality of the walls of the groove and the cut surface of the work material, in which chips can be smoothly disposed without increasing the cutting resistance even when the cutting insert is fed in a traverse direction in order to broaden the groove width in grooving operation, and in which the chips can be steadily controlled when the cutting insert is fed in the longitudinal direction for grooving or cutting-off, thereby improving a tool life of the cutting insert.

In order to solve the above-mentioned problem and achieve the object, the present invention was realized. The present invention is a cutting insert having an insert body formed in a shaft-shape, wherein a cutting edge portion having a square rake face is formed on an end portion of the insert body, and wherein the rake face includes: a pair of side cutting edges extending in a longitudinal direction of the insert body; a front cutting edge extending in a transverse direction perpendicular to the longitudinal direction between each front end of the side cutting edges; a pair of protruded streaks extending toward a corner portion at which each of the side cutting edges intersect the front cutting edge; and a projection which protrudes and is separated from the protruded streaks between front ends of the protruded streaks in the vicinity of the corner portion and the corner portion.

According to the cutting insert of the present invention, the projection protruding between the front ends of the protruded streaks in the vicinity of the corner portion and the corner portion is formed spacing from the pair of the protruded streaks extending toward the corner portion in which the pair of the side cutting edges and the front cutting edge intersect. Therefore, cutting fluid which is supplied to the front end running between the pair of protruded streaks and the side cutting edges on the rake face flows to the front cutting edge in the vicinity of the corner portion through a space between the projection and the front ends of the protruded streaks. As a result, the cutting fluid can be sufficiently supplied to the front cutting edge near the corner portion, thereby providing lubrication and coolant.

In addition, since the projection is formed separated from the front ends of the protruded streaks, when the groove width is broadened as described above, chips which are generated at the side cutting edges especially at the corner portion do not collide with the projection and the protruded streaks. Therefore, the chips are not rubbed, thereby reducing the cutting resistance of the cutting insert. Meanwhile, the chips which collide with the spaced projection and the front ends of the protruded streaks flow out so as to be folded in a width direction thereof, and are further curled in the flowing direction. As a result, the chips are smoothly and properly disposed even though receiving small frictional resistance since the chips are not easily fractured.

Chips which are generated by the front cutting edge are tightly curled in the width direction by colliding and rubbing against the front ends of the pair of protruded streaks and easily fractured when only grooving or cutting-off of a work material is operated by advancing the insert body in the longitudinal direction thereof. The protruded streaks are not lost due to abrasion even though being worn by the rubbing of the chips because the protruded streaks are provided on the rake face having a length that extends toward the corner portion as described above.

The projection may be an undirectional shape such as, for example, a spherical shape, a conical shape, or a frustum shape protruding between the front ends of the protruded streaks at the corner portions and the corner portions. Furthermore, if the projection is formed so as to extend from the front ends of the protruded streaks toward the corner portion, when broadening the groove by feeding the cutting insert in the transverse direction, chips which are generated at the side cutting edge in the corner portion can be guided by the projection to a rear end of the cutting edge portion.

Accordingly, the chips can be prevented from contacting to and damaging a bottom surface of the groove.

However, if the projection is formed so as to extend from the front ends of the protruded streaks toward the corner portion, it is preferable that the projection extend so as to intersect an axis of the longitudinal direction at an angle of 15° to 75° seen in the direction facing the rake face perpendicular to the longitudinal direction. If the angle is below the above range, there is a possibility of the chips not being guided properly toward the rear end of the cutting edge portion. On the other hand, if the angle exceeds the above range, the chips collide with the projection at a small area and cannot be guided stably; furthermore, there is a possibility of the projection being worn down in an early stage.

When forming the projection so it extends from the front ends of the protruded streaks toward the corner portion, the projection may be formed so as to extend continuously. In addition, a plurality of projections may be provided between each front end of the protruded streaks and the corner portion, separated from each other and extending discontinuously. In this case, the cutting fluid can be supplied to the front cutting edge through between the projections; therefore, lubrication and cooling can efficiently be performed.

According to the cutting insert of the present invention, when grooving or cutting-off of a work material is performed, a cutting fluid can be properly supplied to the front cutting edge in the vicinity of the corner portion so that lubrication and cooling can be performed. Therefore, damage and adhesion due to heat at the front cutting edge in the vicinity of the corner portion can be prevented, thereby extending the tool life of the cutting insert, and preventing the work material at walls of the groove or a cut surface from deteriorating in accuracy and quality. In addition, even when broadening the groove by feeding the cutting insert in the transverse direction, it is possible to prevent the chips from colliding with the protruded streaks thereby suppressing the increase of cutting resistance, and properly cutting the chips using the projection and the protruded streaks; accordingly, the chips can be smoothly disposed. Furthermore, even when grooving or cutting-off the work materials by feeding the cutting insert only in the longitudinal direction, the projections which are rubbed against the chips are not worn down. Accordingly, the chips can be disposed stably and smoothly for a long time; and the cutting insert having a long tool life can be provided.

Figure 1:
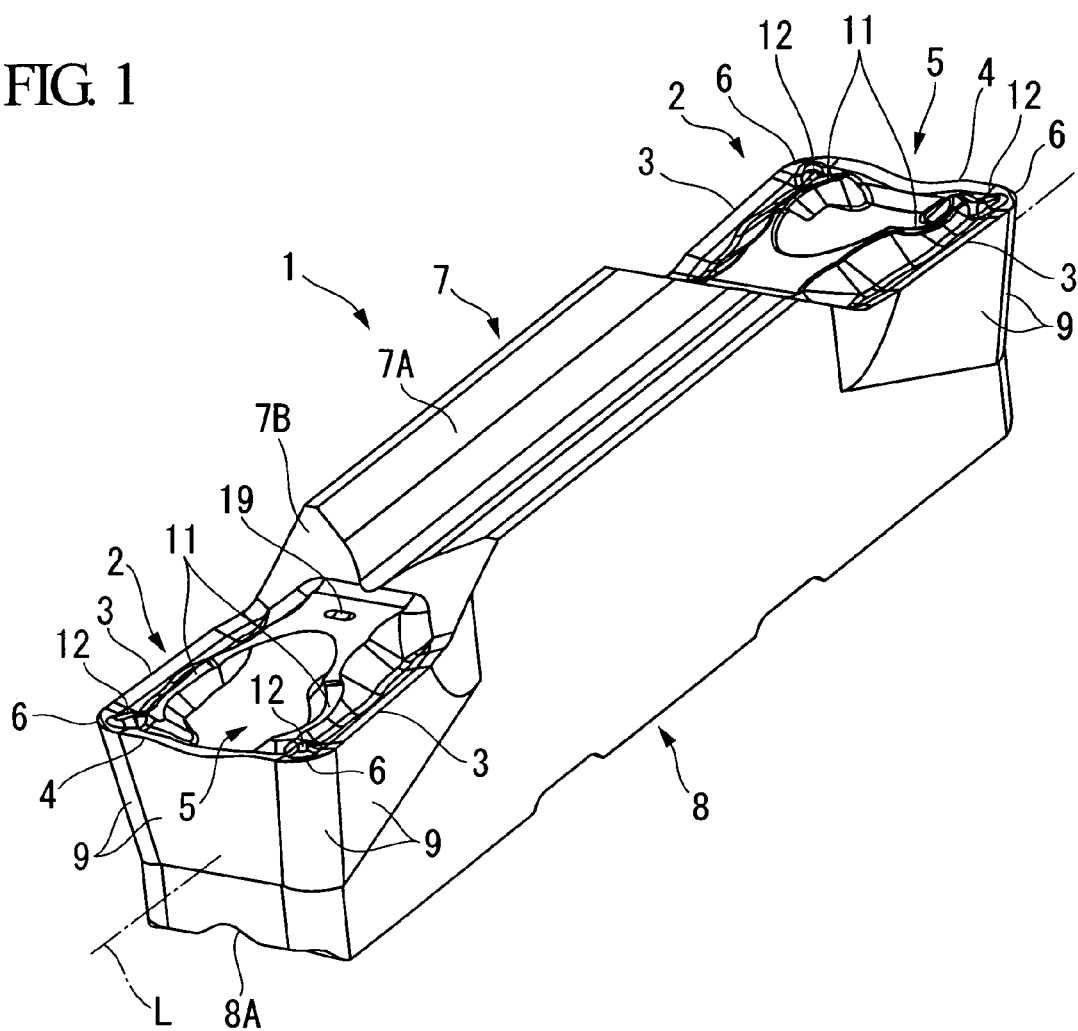
FIG. 1 is a perspective view showing a first embodiment of the present invention.
Figure 2:
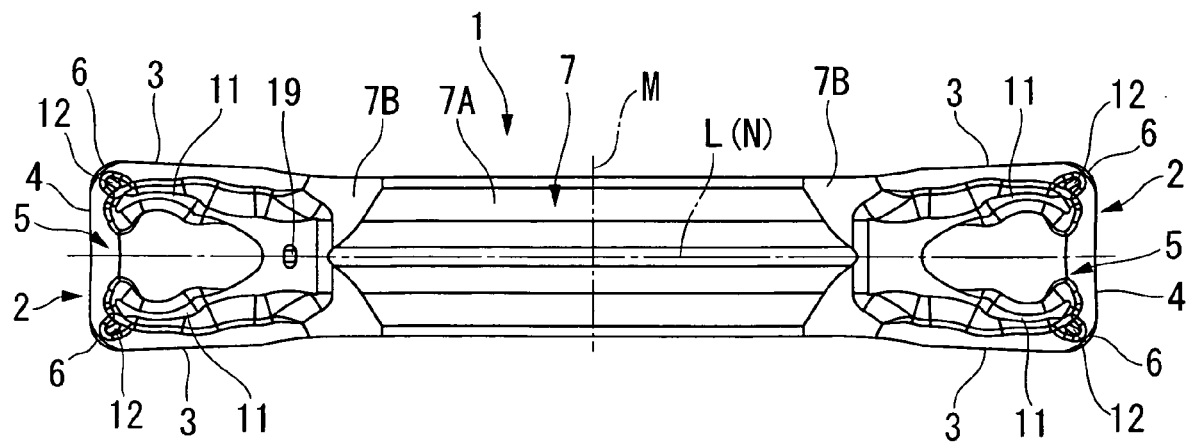
FIG. 2 is a plan view showing the embodiment of FIG. 1 as seen from a direction facing a rake face 5 perpendicular to a longitudinal direction of a cutting insert shown in FIG. 1.

BRIEF DESCRIPTION OF THE REFERENCE SYMBOLS 1, 101, 201, 301, 401, 501, 601, 701: insert body
2: cutting edge portion 3: side cutting edge
4: front cutting edge
5: rake face
6: corner portion
11, 111: protruded streak
11A: first rear end portion of protruded streak 11
11B: second rear end portion of protruded streak 11
11C: second front end portion of protruded streak 11
111C: second front end portion of protruded streak 111
111D: first front end portion of protruded streak 11
111D: first front end portion of protruded streak 111
12, 21 to 23: projection
13: inner wall face of protruded streak 11
14: outer wall face of protruded streak 11
15: protruded end face of protruded streak 11
115: protruded end face of protruded streak 111
16, 116, 216, 316: protruded end face of projection 12, and 21 to 23
17: peripheral wall face of projection 12, and 21 to 23
18: depression between protruded streak 11 and projection 12 and 21 to 23
218: depression between projections 216
L: axis of insert body 1, 101, 201, 301, 401, 501, 601, 701
θ: angle of an extending direction of the projection 12, 21-23 intersecting to the axis L extending in the longitudinal direction of the insert body 1, 101, 201, 301, 401, 501, 601, 701 as seen in a direction facing the rake face 5 perpendicular to a longitudinal direction of the insert body 1, 101, 201, 301, 401, 501, 601, 701

DETAILED DESCRIPTION OF THE INVENTION

FIGS. 1 to 8 show a first embodiment of a cutting insert according to the present invention. An insert body 1 of the present embodiment is formed from a hard material such as cemented carbide or the like, and has substantially a square shaft shape (a square pillar shape) extending along an axis L. The insert body 1 is formed so as to substantially be symmetrical about a plane M perpendicular to the axis L at a center in a longitudinal direction (i.e. the axis L direction; in other words, left and right direction of FIGS. 2 to 4) of the insert body 1. Further, the insert body 1 is formed so as to be symmetrical about a plane N at a center of a width direction (i.e. an up and down direction in FIGS. 2 and 5, and a left and right direction in FIG. 5) of the insert body 1. The plane N is perpendicular to the plane M, includes the axis L, and extends in a thickness direction (i.e. an up and down direction in FIGS. 3 and 5) of the insert body 1.

A cutting edge portion 2 is formed at each of the end portions of the insert body 1 in the longitudinal direction. Both cutting edge portions 2 have the same configuration. A rake face 5 is formed on the cutting edge portion 2 into substantially a rectangular shape extending in the longitudinal direction so as to face the thickness direction, and has a pair of side cutting edges 3 extending in the longitudinal direction and a front cutting edge 4 extending between the side cutting edges 3 in the width direction at a ridge portion thereof. In addition, corner portions 6 in which the front cutting edge 4 and the side cutting edges 3 cross, are formed into a protruding quarter circular arc shape which is tangent to the front cutting edge 4 and the side cutting edges 4 in a plan view as seen from a direction facing the rake face 5 and perpendicular to the longitudinal direction.

Figure 3:
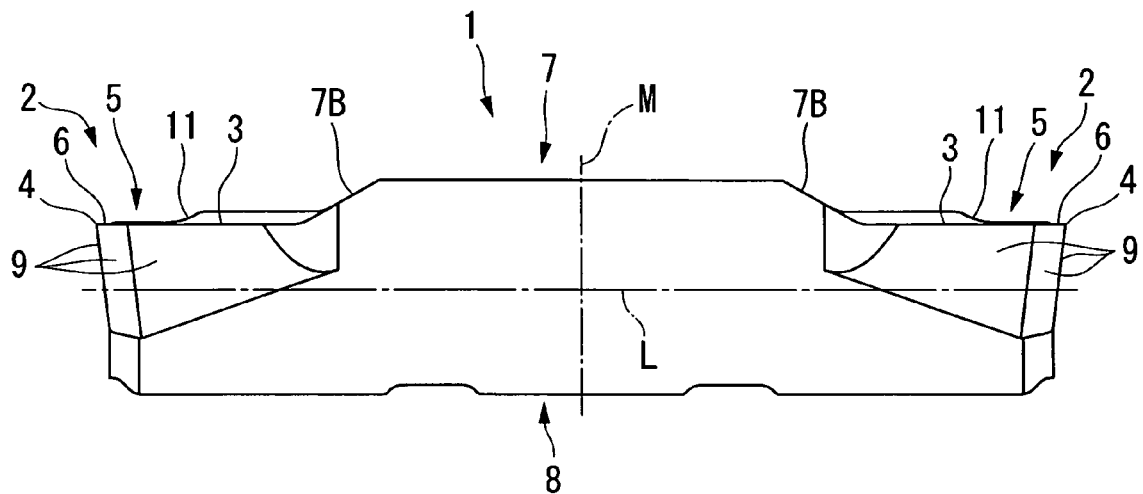
FIG. 3 is a side view showing the embodiment of FIG. 1.
Figure 4:
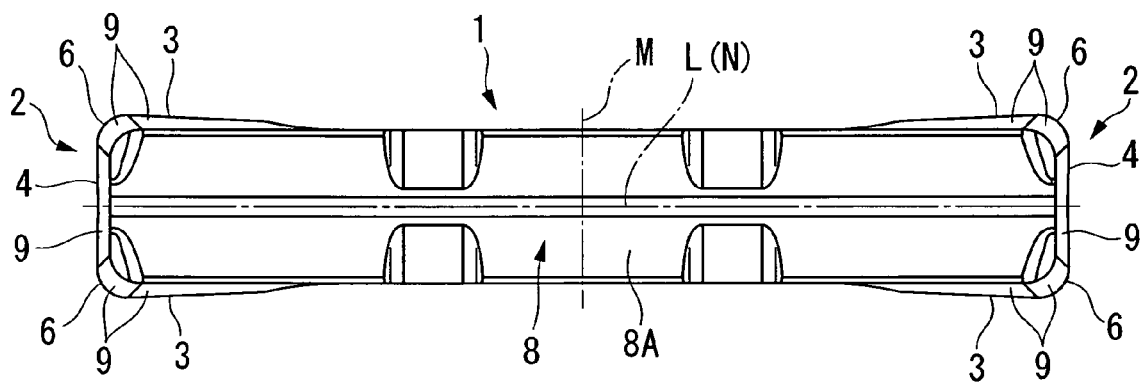
FIG. 4 is a bottom view showing the embodiment of FIG. 1.
Figure 5:
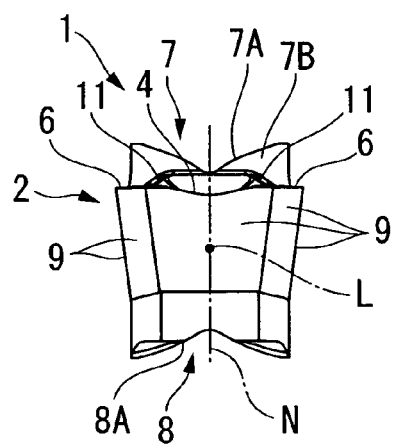
FIG. 5 is a front view showing the embodiment of FIG. 1.

An upper face 7 of the insert body 1 that faces the same direction as the rake face 5 in the thickness direction between both cutting edge portions 2 in the longitudinal direction projects from the cutting edge portions 2 in the width direction as shown in FIG. 3. In addition, installation grooves 7A and 8A having substantially depressed V-sectional shape extending along the entire longitudinal direction are formed at the upper face 7 and a lower face 8 opposite to the upper face 7 respectively. The installation grooves 7A and 8A are held between a pair of jaws of an insert-installation seat formed on a holder of an insert-removable turning tool. The jaws face each other, and together form a protruding V-shape section. The cutting insert is held by the holder and used for grooving or cutting-off of work material. End faces 7B of the upper face 7 are inclined toward the lower face 8 and approach the cutting edge portions 2.

In addition, a front end face of the cutting edge portion 2 facing the longitudinal direction is a flank face 9 of the front cutting edge 4. Both side faces of the cutting edge portion 2 facing the width direction are the flank faces 9 of the pair of the side cutting edges 3. The cutting insert of the present embodiment is a positive-type insert in which the flank faces 9 including crossing ridge portions connected to the corner portions 6 are inclined so as to gradually recede from the rake face 5 toward the lower face 8. End faces and side faces of the insert body 1, except for the flank faces 9 of the cutting edge portions 2, are flat faces extending in the thickness direction and parallel to each other.

Figure 7:
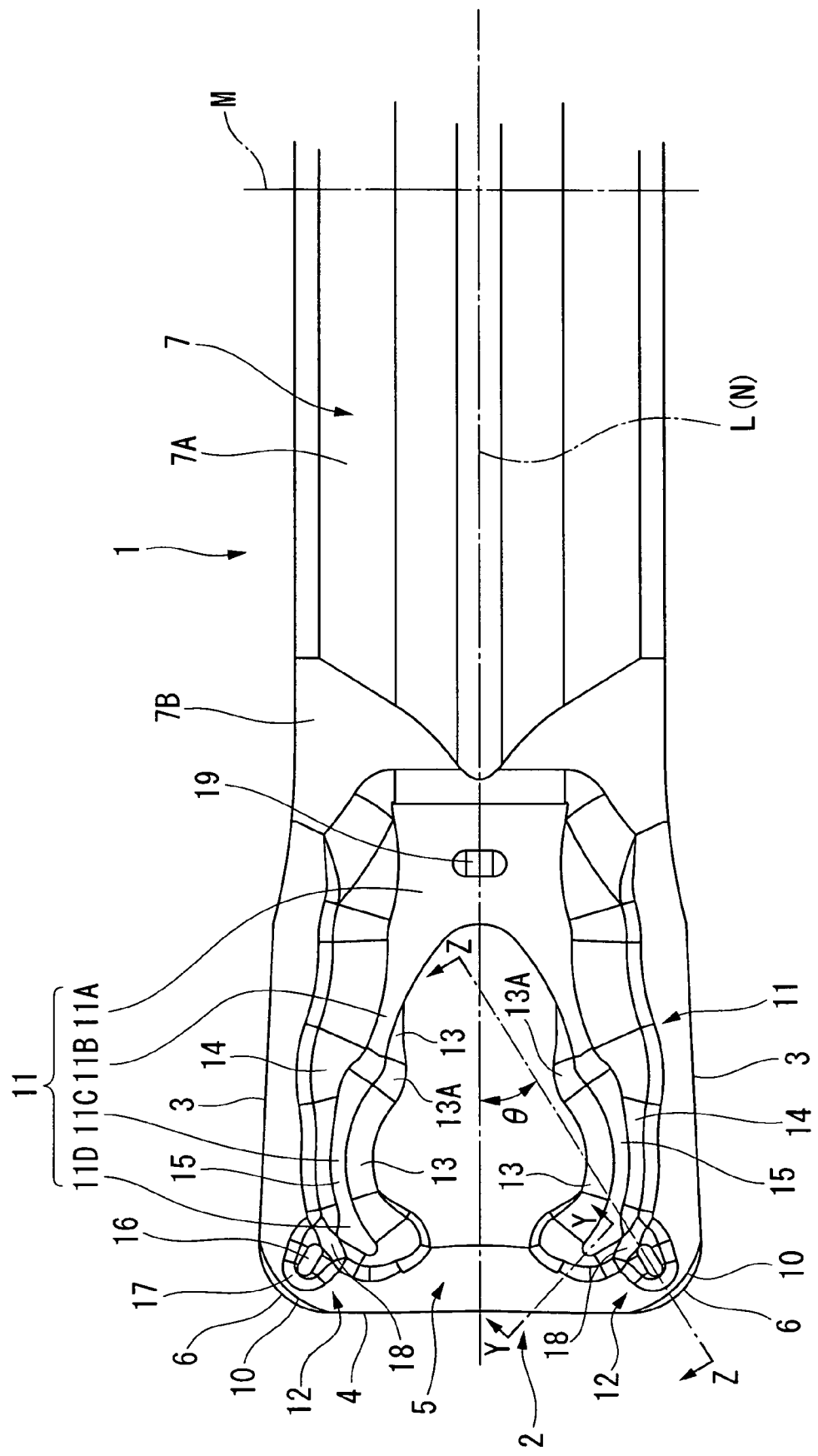
FIG. 7 is an enlarged plan view showing the cutting edge portion 2 in FIG. 2.

The pair of the side cutting edges 3 including the corner portions 6 is formed so as to extend on a plane perpendicular to the width direction as shown in FIG. 3. The pair of the side cutting edges 3 forms a back taper of the cutting insert by being slightly inclined so as to approach each other in the width direction from the corner portions 6 toward the rear end of the cutting edge portion 2. The front cutting edge 4 is formed so as to extend linearly as seen in the plan view. Meanwhile, in the thickness direction, the front cutting edge 4 is formed so that both ends thereof at the corner portions 6 extend on the same plane as the corner portions 6 and the side cutting edges 3. Further, the front cutting edge 4 is formed so that a middle portion thereof in the width direction is slightly depressed in the thickness direction and forms a recessed curved line. In addition, an extremely narrow land 10 is formed at least each of the corner portions 6 as shown in FIG. 7. The rake face 5 is a positive rake face which is inclined so as to gradually recede in the thickness direction at a distance from the side cutting edges 3, the front cutting edge 4, and the corner portions 6 toward the inside thereof.

A pair of protruded streaks 11 is formed further inside the rake face 5 which is the positive rake face. The protruded streaks 11 extend toward the corner portions 6, and protrude from the rake face 5 in the thickness direction. Projection 12 is formed at each of the spaces between a front end at the corner portion 6 of the protruded streaks 11 and the corner portion 6, separated out from the protruded streak 11, and protruded in the thickness direction. The protruded streaks 11 and the projections 12 are also separated from the side cutting edges 3, the front cutting edge 4, and the corner portions 6.

Each of the protruded streaks 11 has an inner wall face 13 facing inside the rake face 5 and an outer wall face 14 facing the side cutting edge 3. The inner wall face 13 is formed on each of the protruded streaks 11; and the pair of the inner wall faces 13 faces each other as seen in the plan view. The outer wall face 14, which is formed on each of the protruded streaks 11, faces the side cutting edge 3 which is connected to the corner portion 6 toward which the protruded streak 11 thereof extends. In other words, the outer wall faces 14 of the pair of the protruded streaks 11 face opposite. In the present embodiment, the highest protruded ridge in the thickness direction in which the inner wall face 13 and the outer wall face 14 are connected is a protruded end face 15. The inner wall face 13 and the outer wall face 14 are inclined from the protruded end face 15 so as to be separated from each other as approaching the rake face 5, and are connected to the protruded end face 15 at an obtuse angle.

The pair of protruded streaks 11 extends, from a narrower first rear end portion 11A than the end face 7B of the upper face 7, toward the front end of the cutting edge portion 2 with bifurcating so as to be adjacent to each of the side cutting edges 3 which is connected to the corner portion 6 respectively. A second rear end portion 11B is branched from the first rear end portion 11A extending to substantially a middle of the side cutting edge 3 in the longitudinal direction. The second rear end portions 11B are formed so as to extend directly toward the corner portions 6 as seen in the plan view in a V-shape. A second front end portion 11C extending from each of the second rear end portions 11B is formed so as to bend convexly toward the adjacent side cutting edge 3 as seen in the plan view.

More specifically, the second front end portion 11C as seen in the plan view is formed so that the protruded end face 15 approaches the side cutting edge 3 adjacent to the protruded streak 11 while extending from the second rear end portion 11B toward the front end of the cutting edge portion 2, and further extends in a convex arc-shape curved line so as to be separated from the side cutting edge 3. Accordingly, in the second front end portion 11C, the inner wall face 13 of each of the protruded streaks 11 has a recessed curved face which dents toward the side cutting edge 3 adjacent to the protruded streak 11 as seen in the plan view. On the contrary, the outer wall face 14 is a protruded curved face projecting toward the side cutting edge 3. The radius of curvature of the recessed curved face of the inner wall face 13 is slightly smaller than that of the protruded curved face of the outer wall face 14 at the crossing ridge portion of the inner wall face 13, the outer wall face 14, and the protruded end face 15.

A first front end portion 11D of the protruded streak 11 is formed so as to bend substantially parallel to the protruding circular arc of the corner portion 6 as seen in the plan view, or is formed so as to extend linearly and parallel to a chord of the circular arc direction. The position of the front end of the first front end portion 11D corresponds to an end position of a recessed curved line of the front cutting edge 4 receding in the thickness direction. The protruded end face 15 in the first front end portion 11D is formed as seen in the plan view so that a portion, in which a bisector of the corner portion 6 and the protruded end face 15 are crossed, slightly projects toward the corner portion 6 so that the width of the protruded end face 15 is broadened at the portion. The protruded end face 15 is formed so as to gradually narrow from the broadened portion to the front end so that the crossed ridge in which the protruded end face 15 and the outer wall face 14 extends linearly. The protruded end face 15 is formed so that the outer wall surface 14 forms a recessed curved face, thereby becoming narrow at a short portion in which the outer wall face 14 forms the protruded curved face from the broadened portion to the second front end portion 11C.

The second rear end portion 11B of the protruded streak 11 is formed so that the inner wall face 13 and the outer wall face 14 recede from each other as seen in the plan view. The inner wall face 13 is formed so that the second rear end portion 11B is concavely bent in a direction to form an obtuse angle with the second front end portion 11C. However, a meandered portion 13A in which the second front end portion 11C and the second rear end portion 11B intersect each other and form the recessed curved faces of the inner wall face 13 is formed as a protruded curved face in which the recessed curved faces are each smoothly connected. A space in the width direction between the meandered portions 13A of the pair of protruded streaks 11 at the protruded end face 15 is narrower than the space in the width direction between the front ends of the pair of protruded streaks 11 at the protruded end face 15. The second rear end portion 11B of the outer wall face 14 is smoothly connected to the second front end portion 11C forming the protruded curved face as seen in the plan view, and is bent concavely with respect to the side cutting edge 3.

Figure 6:
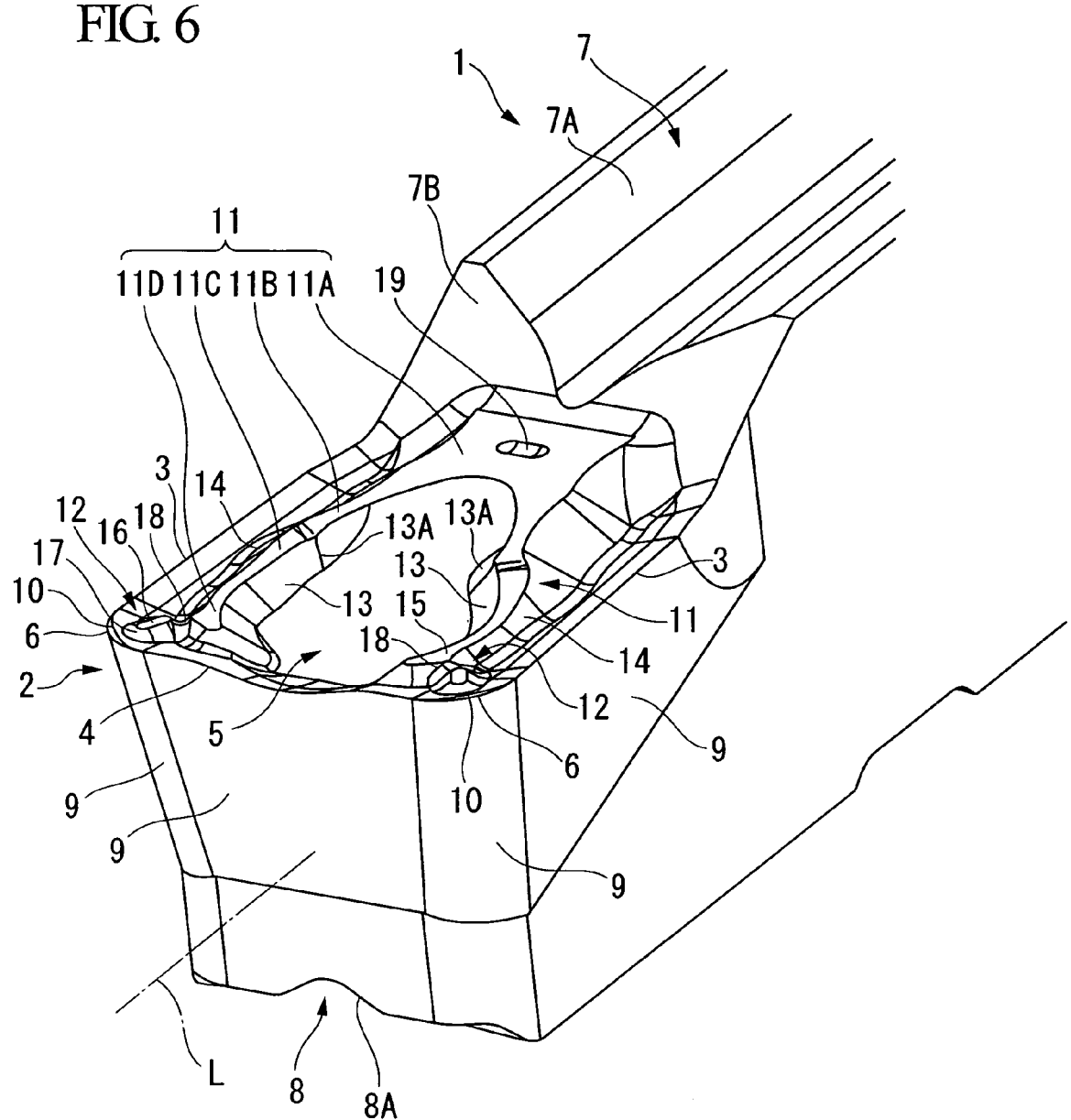
FIG. 6 is an enlarged perspective view showing a cutting edge portion 2 of the embodiment of FIG. 1.

The protruded end face 15 is perpendicular to the thickness direction within a field from the first rear end portion 11A to the second rear end portion 11B, and is a flat plane slightly receding in the thickness direction from the groove bottom of the installation groove 7A. The protruded end face 15 is concavely bent from the meandered portion 13A toward the front end thereof at the second front end portion 11C, and recedes in the thickness direction, as shown in FIGS. 3 and 6; then reaches to the first front end portion 11D of the protruded streak 11 forming a perpendicular plane to the thickness direction. The protruded end face 15 at the first front end portion 11D is located very slightly projecting from the plane perpendicular to the thickness direction on which the side cutting edge 3 is formed. The rake face 5 inside the inner wall faces 13 of the pair of protruded streaks 11 is smoothly connected to the inner wall faces 13 and is formed in a recessed curved face so as to form a smoothly continuing recessed curved line in the cross section along the thickness direction in either the width direction or the longitudinal direction.

Figure 8:
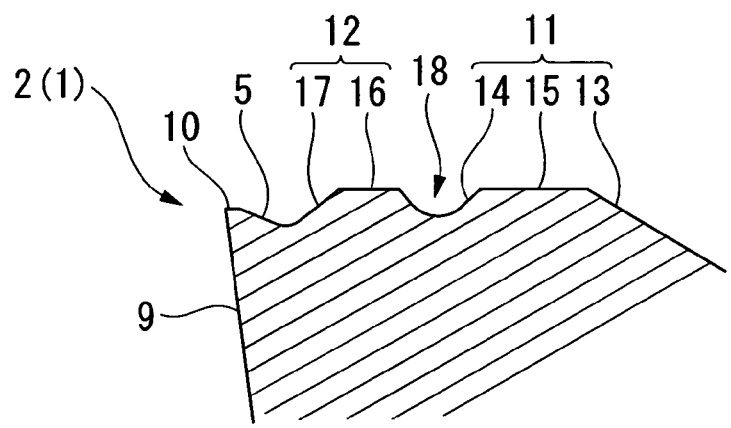
FIG. 8 is an enlarged sectional view taken along a Z-Z line in FIG. 7.

The projection 12 is located on the bisector of each of the corner portions 6 at a distance from the corner portion 6 and the protruded streak 11. The projection 12 of the present embodiment has a flat protruded end face 16, and a surrounding wall 17 which is located around the protruded end face 16, intersects with the protruded end face 16 at an obtuse angle, and is inclined so as to gradually broaden as approaching the rake face 5. The height of the protruded end face 16 in the thickness direction is, as shown in FIG. 8, the same as the height of the protruded end face 15 of the protruded streak 11 at the first front end portion 11D. Thus, since the projection 12 is separated from the protruded streak 11, a recessed portion 18 is formed between the projection 12 and the protruded streak 11 so as to be recessed in the thickness direction relative to a portion in which the surrounding wall 17 intersects the outer wall face 14. The bottom face of the recessed portion 18 is formed into a recessed curved face, as shown in FIG. 8.

The projection 12 of the present embodiment is formed so as to extend toward the corner portion 6 from the first front end portion 11D of the protruded streak 11. In detail, the protruded end face 16 has an oval shape as seen in the plan view; and a longitudinal axis of the oval extends toward the corner portion 6 while inclined to outside the width direction as approaching the front end of the cutting edge portion 2. It is preferable that, as seen in the plan view, the direction of the projection 12 extending toward the corner portion 6 be set so as to intersect at an angle of 15° to 75° with respect to the axis L extending in the longitudinal direction of the insert body 1. The angle of the longitudinal axis of the oval and the axis L in the present embodiment is 30° which is smaller than an angle of the bisector and the axis L.

The projection 12 is located so that the front end in the axis L direction, especially, the front end of the protruded end face 16 is nearer to the front cutting edge 4 than the protruded streak 11. However, the projection 12 is sufficiently small comparing with the protruded streak 11. For example, the protruded end face 16 having an oval shape has substantially the same size as or a smaller size than a portion of the protruded streak 11 at the first front end portion 11D from the protruded portion toward the corner portion 6 to the front end. A reference symbol 19 in the drawings denotes a mark to distinguish the cutting edge portions 2 formed at both ends of the insert body 1. The mark 19 of the present embodiment is a recessed portion on the protruded end face 15 of the first rear end portion 11A of the protruded streak 11 and is formed only on one of the pair of the cutting edge portions 2.

The cutting insert constructed as described above, grooving or cutting-off of the work material is operated by the front cutting edge 4 and the corner portions 6 at both ends of the cutting edge portion 2 while advancing the insert body 1 in the axis L direction. In this case, chips are generated by the front cutting edge 4 and the corner portions 6 and flows out in the axis L direction. The chips are collided with the projection 12 at the forefront in the axis L direction and guided inward the width direction. Then, the chips are collided to and rubbed with the first front end portion 11D of the protruded streak 11, and are resisted. As a result, the chips are bent and curled in the width direction. In addition, the chips are curled in the width direction since the front cutting edge 4 is recessed at the middle portion in the width direction.

The curled chips in the width direction scratch the rake face 5, which is a recessed curved face; in the meantime, the chips are further curled in the width direction and also in the axis L direction, i.e. the flowing out direction, and flow out to the second rear end portion 11B of the protruded streak 11. The inner wall face 13 of the protruded streak 11 at the second front end portion 11C of the present embodiment has a recessed curved face which is depressed toward the side cutting edge 3. Furthermore, the space between the inner wall faces 13 of the pair of the protruded streaks 11 is narrow at the meandered portion 13A. Therefore, by being collided to the meandered portion 13A, the chips are further resisted in the width direction and the flowing direction in which the chips are curled as mentioned above; as a result, the chips are fractured and disposed.

Therefore, when grooving or cutting-off the work material, if a cutting fluid is supplied from the rear end portion of the cutting edge portion 2 toward the rake face 5 in order for a lubrication, coolant, and the like of a cutting portion by the front cutting edge 4 and the corner portions 6, the cutting fluid flows to the front end portion mainly between the protruded streak 11 and the side cutting edge 3 since the chips scratch the inside of the protruded streaks 11 as mentioned above. However, in the cutting insert having the above configuration, the projection 12 formed between the first front end portion 11D and the corner portion 6 projects at a distance from the protruded streak 11; and the recessed portion 18 which connects the rear end portion with the front end portion of the cutting edge 2 is defined between the protruded streak 11 and the projection 12. Therefore, the cutting fluid can reliably be supplied to the front cutting edge 4 via the recessed portion 18.

According to the above cutting insert, the supplied cutting fluid can efficiently lubricate and cool the cutting portion of the front cutting edge 4. Accordingly, an increase of the cutting resistance can be suppressed, and damage and adhesion of the front cutting edge 4 due to heat of cutting can be prevented; therefore, the tool life of the cutting insert can be extended. Furthermore, the recessed portion 18 between the protruded streak 11 and the projection 12 is open toward the corner portion 6 of the front cutting edge 4; therefore, damage or adhesion of the recessed portion 18 can be reliably prevented. As a result, a groove wall face of a work material which has been grooved and a cut face of a work material which has been cut off can be formed accurately with quality by the corner portions 6 of the front cutting edge 4.

Figure 9A:
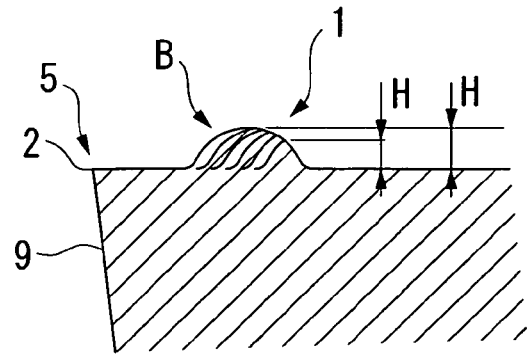
FIG. 9A is a sectional view showing a variation of a height H of a burl of JP H09-174308 due to wear.

Furthermore, when grooving or cutting-off is operated by advancing the insert body 1 in the longitudinal direction (i.e. the axis L direction), the chips are resisted and curled by being collided with and rubbed with the first front end portion 11D of the protruded streak 11. The frictional resistance causes an abrasion on the protruded streak 11; however, it is not worn flat entirely since it is formed so as to have a length extend toward the corner portion 6 on the rake face 5. If the chips rub against a burl (a boss) of JP H09-174308, as shown in FIG. 9A, a height of a burl B is gradually reduced by increasing the abrasion; as a result, the burl B is disappeared at last. Note, the other portions of the burl B in FIG. 9A are denoted by the same reference symbols as the first embodiment shown in FIG. 9B, and the description thereof is omitted.

Figure 9B:
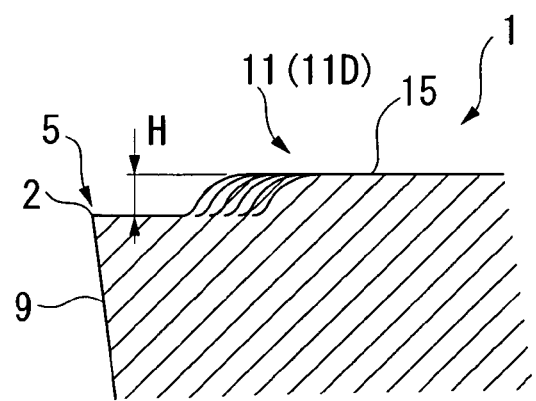
FIG. 9B is a sectional view showing a variation of a height H of a protruding streak 11 of the first embodiment due to wear, corresponding to a sectional view taken along a Y-Y line of FIG. 7.

If the protruded streak 11 of the cutting insert is rubbed with the chips, as shown in FIG. 9B, even though the first front end portion 11D is reduced by the abrasion but not worn out to be disappeared. In addition, in the present embodiment, the protruded end face 15 of the first front end portion 11D of the protruded streak 11 is a flat plane perpendicular to the thickness direction. Therefore, as shown in FIG. 9B, the height H of the protruded end face 15 is not changed even though it is receded by the abrasion. Accordingly, since a constant frictional resistance can be continually given to the chips, the chips can be smoothly disposed and the cutting insert having a long tool life can be provided.

When grooving is operated, the insert body 1 is advanced in the axis L direction so that a groove is formed into a prescribed depth, and then the insert body 1 is fed in the width direction (i.e. transverse direction) so as to broaden the groove width; cutting is operated by the side cutting edge 3 and the corner portion 6 which advance in the width direction. In this case, the protruded streak 11 and the projection 12 are located at a distance in the cutting insert having the above configuration; therefore, the cutting resistance can be reduced and the chips can be smoothly and reliably disposed.

The chips generated by the side cutting edge 3 and the corner portion 6 which is connected to the side cutting edge 3 in such a manner flow out in the width of the prescribed depth along the width direction of the insert body 1 and are collided to the outer wall faces 14 and the projection 12. The chips are not in contact with the protruded streak 11 and the projection 12, especially with the outer wall face 14 of the protruded streak 11, over the whole surface thereof since the protruded streak 11 and the projection 12 are located at a distance; therefore, the collision resistance of the chips can be reduced. Particularly in the present embodiment, the outer wall face 14 of the protruded streak 11 at the second front end portion 11C is a protruded curved surface which protrudes toward the side cutting edge 3 as seen in the plan view. As a result, the chips are collided to a nearest portion by the side cutting edge 3 by protruding among the outer wall face 14 to which the chips are collided. Therefore, the cutting resistance given from the chips can be further reduced.

On the other hand, by colliding the protruded streak 11 and the projection 12 with a distance, similarly to a case in which the chips generated at the front cut edge 4 collide to the front end of the protruded streaks 11, the chips generated at the side cutting edge 3 are bent so as to be curled in the width direction thereof (i.e. the longitudinal direction of the insert body 1), and also curled in the flow direction (i.e. the width direction of the insert body 1) by being pressed against the protruded streak 11 and the projection 12 which protrude from the rake face 5. Accordingly, by bending in the width and flow direction, the chips are easily fractured by a stress; therefore, the chips can be reliably fractured and smoothly disposed even though the collision stress of the chips against the protruded streak 11 and the projection 12.

Furthermore, the projection 12 is formed between the first front end portion 11D of the protruded streak 11 extending toward the corner portion 6 and the corner portion 6. Accordingly, the chips can be reliably guided between the first front end portions 11D of the protruded streaks 11 or between the protruded streak 11 and the projection 12 and disposed, even when grooving or cutting-off is operated at the front cutting edge 4 by advancing the insert body 1 in the axis L direction, when the insert body 1 is fed in the width direction in order to broaden the groove width, in addition, when cutting a wall face of the groove formed at the work material or an end surface of the work material by advancing the insert body 1 in the longitudinal direction and simultaneously feeding in the width direction or by reversing the insert body 1 and simultaneously feeding in the width direction.

In the case in which the groove wall face or the end surface of the work material is cut by feeding the insert body 1 in the width direction simultaneously advancing, the chips are generated at a portion of the insert body 1 extending from the backward corner portion 6 in the width feeding direction toward the front cutting edge 4, and flow out obliquely backward in the width feeding direction from the front cutting edge 4 toward the rear of the axis L direction. The chips are collided with the projection 12 between the backward corner portion 6 in the width feeding direction and the first front end portion 11D of the protruded streak 11. As a result, the chips are guided so as to flow along the axis L, in contact with the protruded streak 11 backward in the width feeding direction, or rolled inside this protruded streak 11 and curled.

Meanwhile, in the case in which the groove wall face or the end surface of the work material is cut by feeding the insert body 1 in the width direction simultaneously moving backward, the chips are generated at a front portion of the side cutting edge 3 extending from the forward corner portion 6 in the width feeding direction toward the rear of the axis L direction. The chips flow out obliquely backward in the width feeding direction toward the front of the axis L direction. However, the projection 12 is also formed between the forward corner portion 6 in the width feeding direction and the protruded streak 11 in the flow out direction with respect to the side cutting edge 3 at which the chips are generated. Therefore, the chips collided to the projection 12 are guided so as to flow along the width direction perpendicular to the axis L; accordingly, similarly to the case in which the insert body 1 is fed only in the transverse direction for cutting, the chips are collided with the projection 12 and the outer wall face 14 of the protruded streak 11, and are disposed. That is, even when the insert body 1 is fed obliquely, the chips can be reliably disposed by the cutting insert having the above configuration.

The projection 12 of the present embodiment is formed so that the protruded end face 16 has an oval shape as seen in the plan view and extends from the first front end portion 11D of the protruded streak 11 toward the corner portion 6. Accordingly, in the case in which the insert body 1 is fed only in the width direction so as to broaden the groove width, the chips collided to the projection can flow out so as to be guided along the direction in which the projection 12 extends toward the rear of the cutting edge portion 2. Therefore, it can be prevented that the chips which are generated at the side cutting edge 3 and rolled in the flow direction along the width direction of the insert body 1 from contacting with the cut groove wall face thereby damaging the groove wall face; as a result, the operation can be improved in both accuracy and quality.

In the present embodiment, the extending direction of the projection 12 extending toward the corner portion 6, that is, the longitudinal axis direction of the oval of the protruded end face 16 of the projection 12 is set so as to intersect at an angle θ of 15° to 75° with respect to the axis L. If the angle θ is too small and the projection 12 extends along substantially parallel to the longitudinal direction of the insert body 1, that is, the projection 12 extends along substantially parallel to the extending direction of the side cutting edge 3, the chips flow out in the width direction of the insert body 1, are rolled and in contact with the groove wall face. On the contrary, if the angle θ is too large and the projection 12 extends along substantially perpendicular to the side cutting edge 3 as seen in the plan view, the chips collide to the projection 12 at a point and it is difficult to stably guide the chips; furthermore, there is a possibility of the projection 12 is worn in an early stage.

Figure 10:
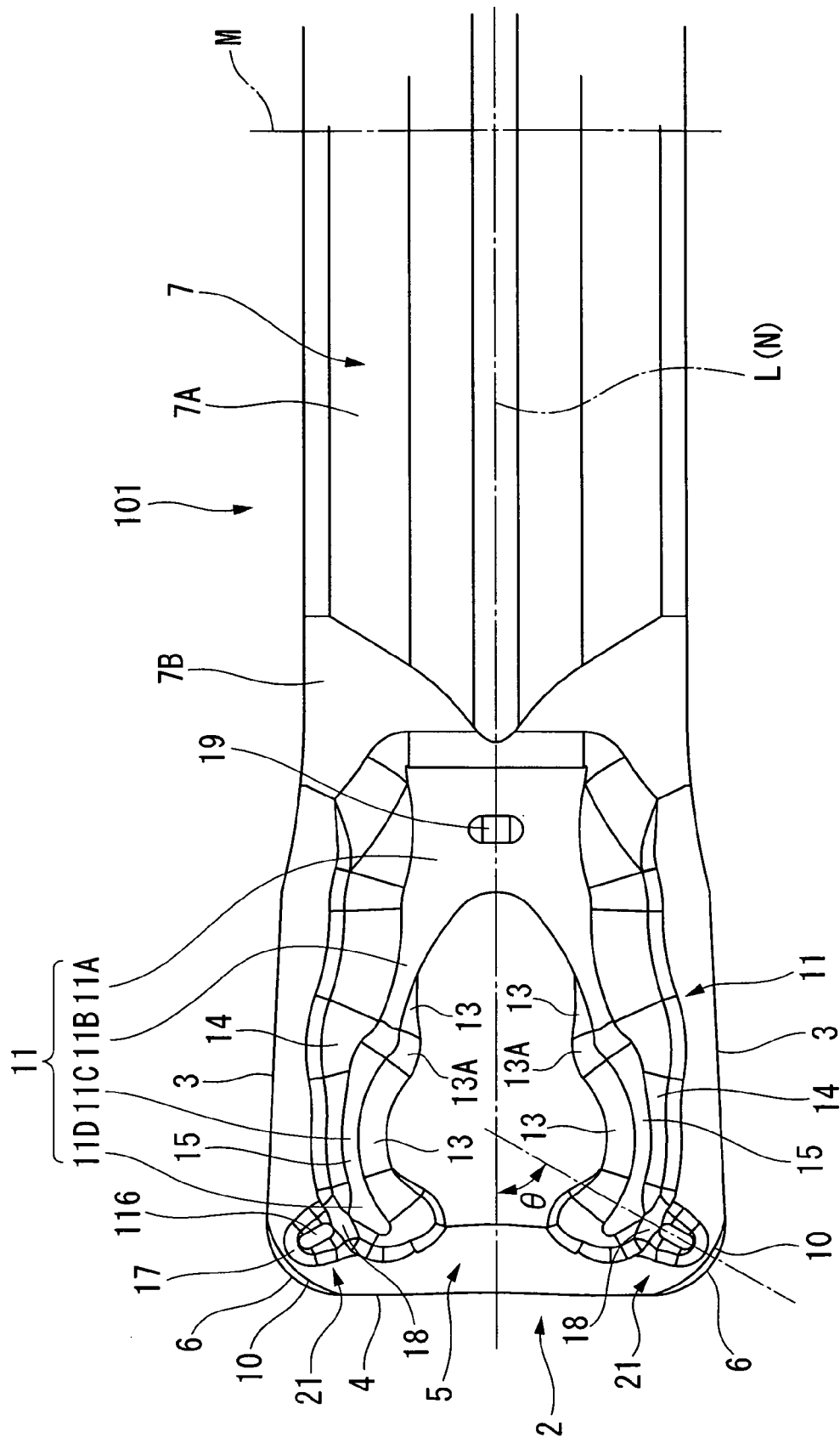
FIG. 10 is an enlarged plan view showing a cutting edge portion 2 of a second embodiment according to the present invention as seen from a direction facing a rake face 5 perpendicular to a longitudinal direction of a cutting insert.

In the present embodiment, the angle θ which the extension direction of the projection 12 forms with respect to the axis L as seen in the plan view is smaller than the angle which the bisector of the corner portion 6 forms with respect to the axis L. If the angle θ is within the above range, as a second embodiment of the present invention shown in FIG. 10, the angle θ which the extending direction of a projection 21 forms with respect to the axis L may be larger than the angle which the bisector of the corner portion 6 forms with respect to the axis L. In addition, the angle θ in the second embodiment is set to 60°. According to the second embodiment in which the angle θ is large, when grooving or cutting-off is accomplished by feeding an insert body 101 in the axis L direction, the cutting fluid can be supplied to a broad area, i.e. not only the front cutting edge 4 by the corner portion 6 but also to the corner portion, through the recessed portion 18. Accordingly, the resistance can further be reduced, and heat damage and adhesion can further be prevented.

Figure 11:
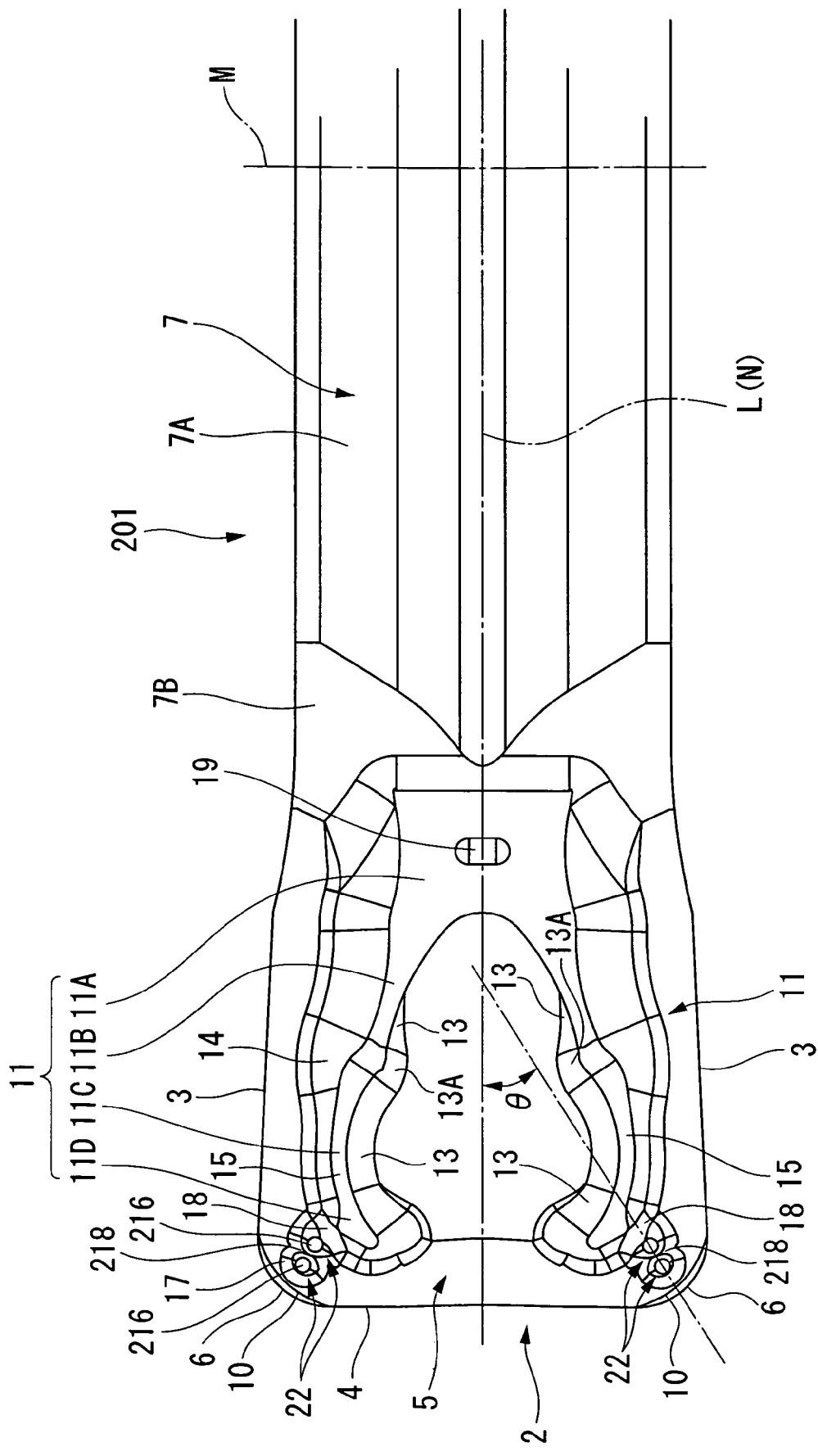
FIG. 11 is an enlarged plan view showing a cutting edge portion 2 of a third embodiment according to the present invention as seen in a direction facing a rake face 5 perpendicular to a longitudinal direction of a cutting insert.

The projection 12 of the first embodiment and the projection 21 of the second embodiment are formed so that the protruded end face 16, 116 has an oval shape extending toward the corner portion. In an insert body 201 according to a third embodiment of the present invention shown in FIG. 11, a plurality of projections 22 each having, for example, a truncated conical shape or the like, may be formed so as to be arranged with a distance discontinuous from the first front end portion 11D of the protruded streak 11 toward the corner portion 6. In this case, the cutting fluid can be supplied to the front cutting edge 4 through a recessed portion 218 between the projections 22 in addition to the recessed portion 18 between the projection 22 and the protruded streak 11. Accordingly, the amount of cutting fluid can be increased.

Figure 12:
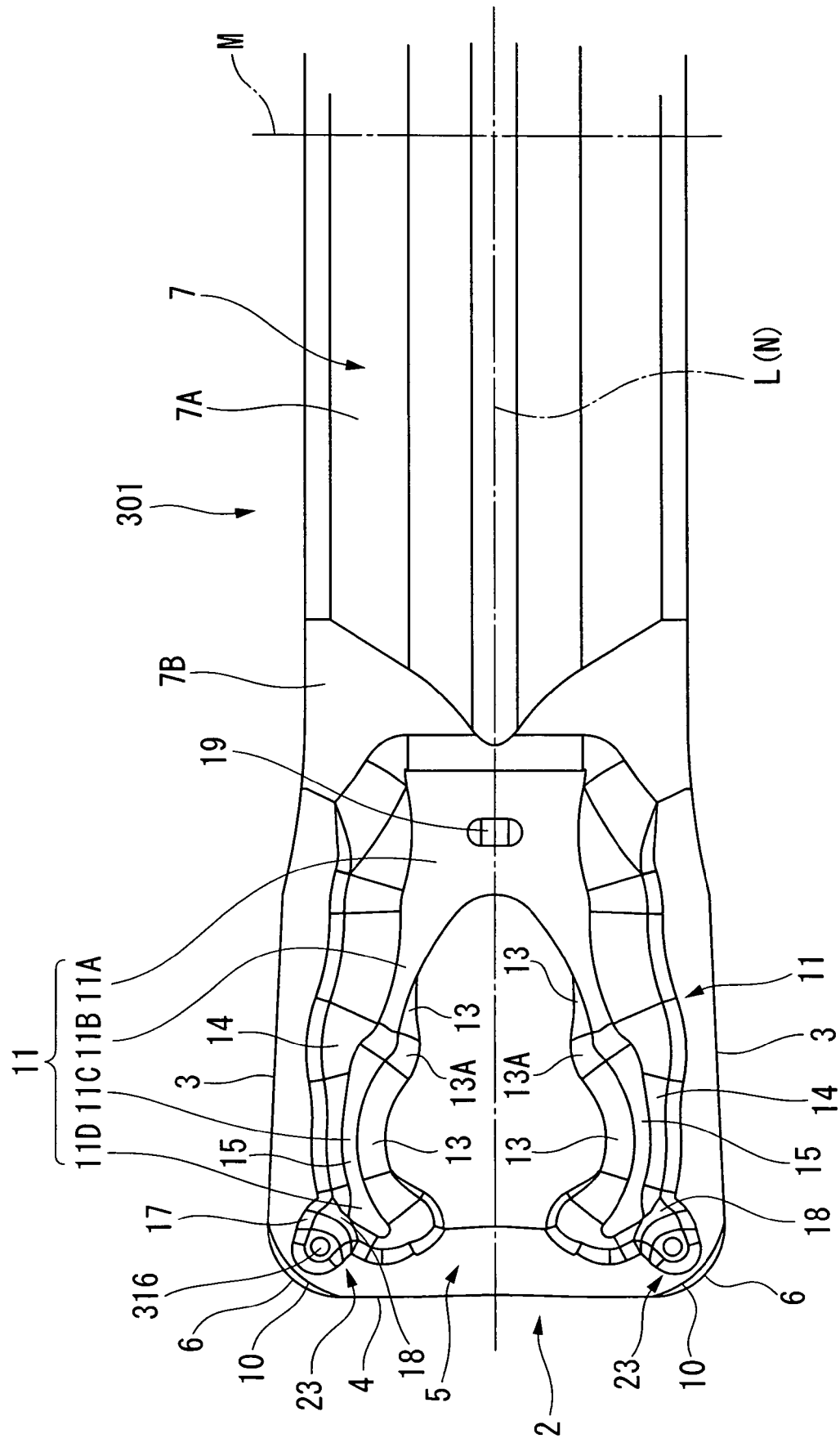
FIG. 12 is an enlarged plan view showing a cutting edge portion 2 of a fourth embodiment according to the present invention as seen from a direction facing a rake face 5 perpendicular to a longitudinal direction of a cutting insert.
Figure 13:
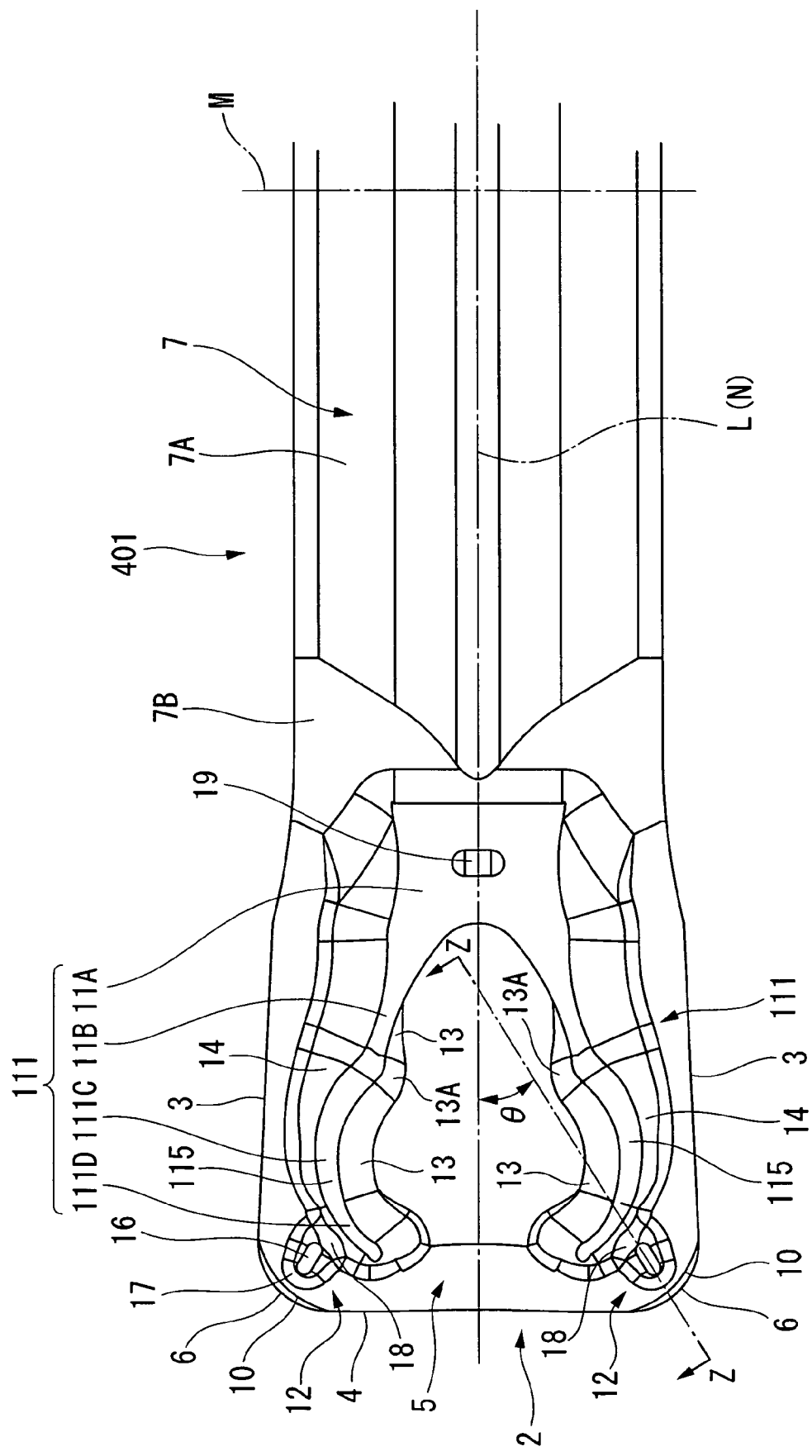
FIG. 13 is an enlarged plan view showing a cutting edge portion 2 of a modified embodiment of the first embodiment as seen from a direction facing a rake face 5 perpendicular to a longitudinal direction of a cutting insert.
Figure 14:
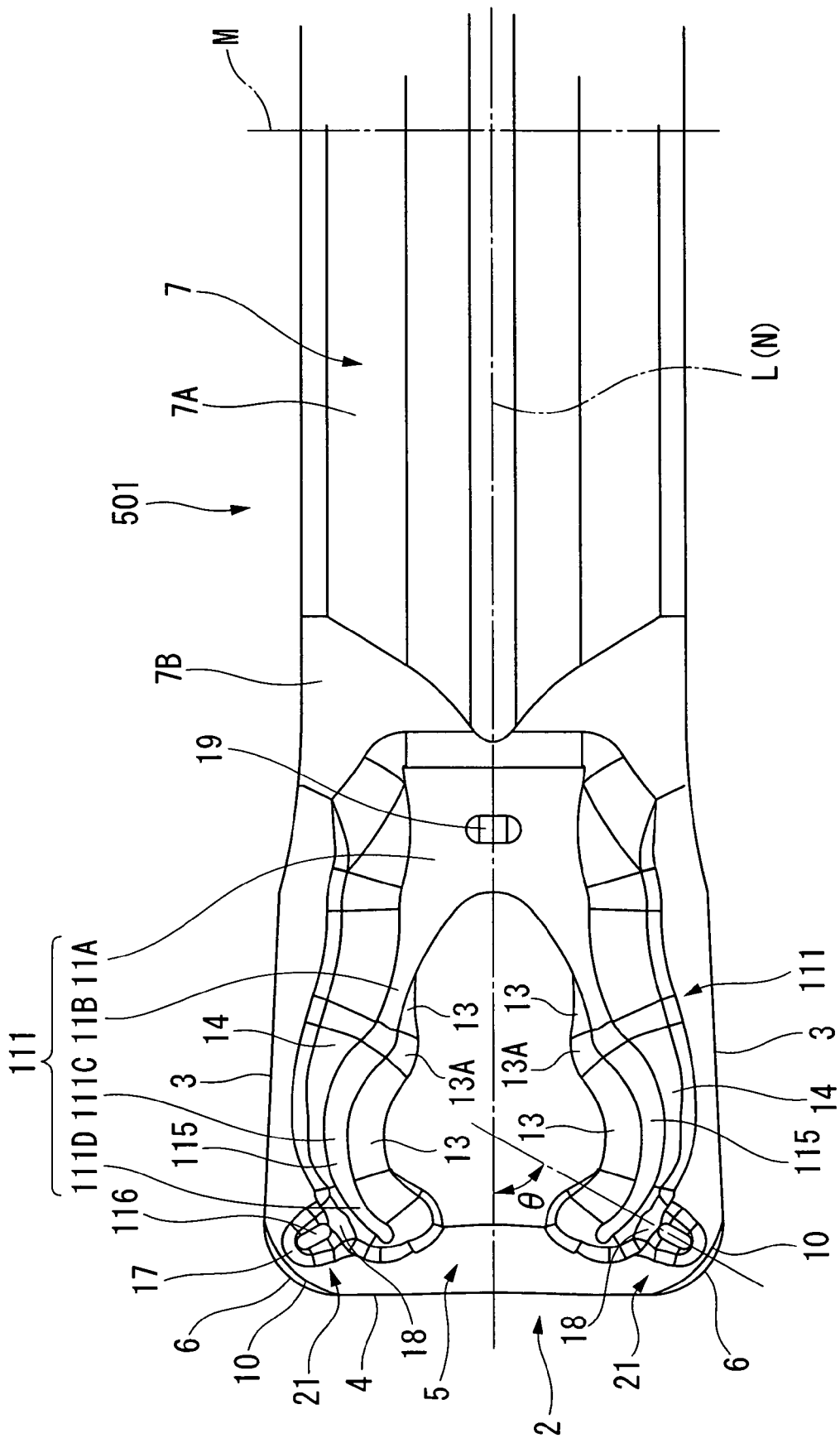
FIG. 14 is an enlarged plan view showing a cutting edge portion 2 of a modified embodiment of the second embodiment as seen from a direction facing a rake face 5 perpendicular to a longitudinal direction of a cutting insert.
Figure 15:
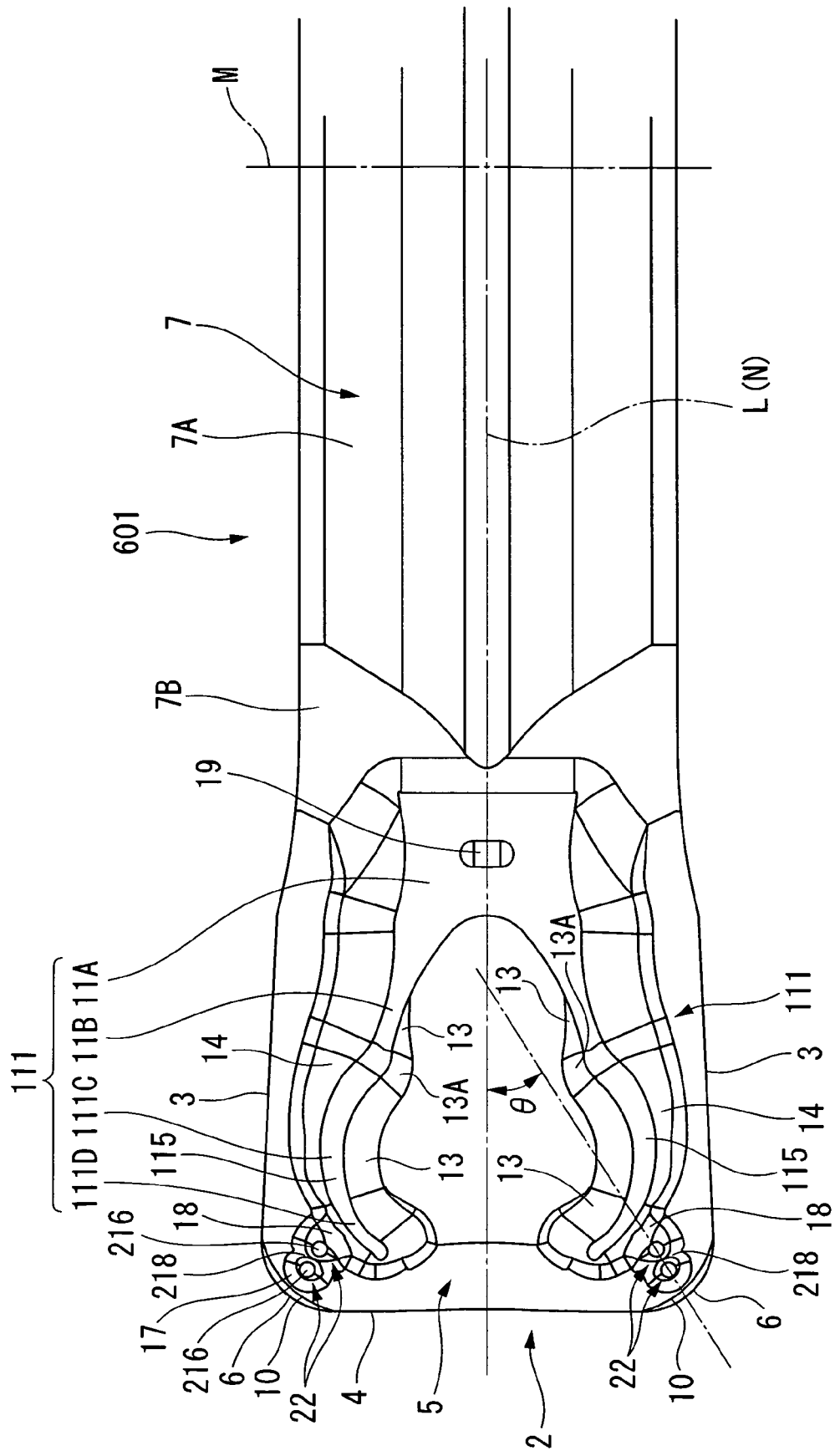
FIG. 15 is an enlarged plan view showing a cutting edge portion 2 of a modified embodiment of the third embodiment as seen from a direction facing a rake face 5 perpendicular to a longitudinal direction of a cutting insert.
Figure 16:
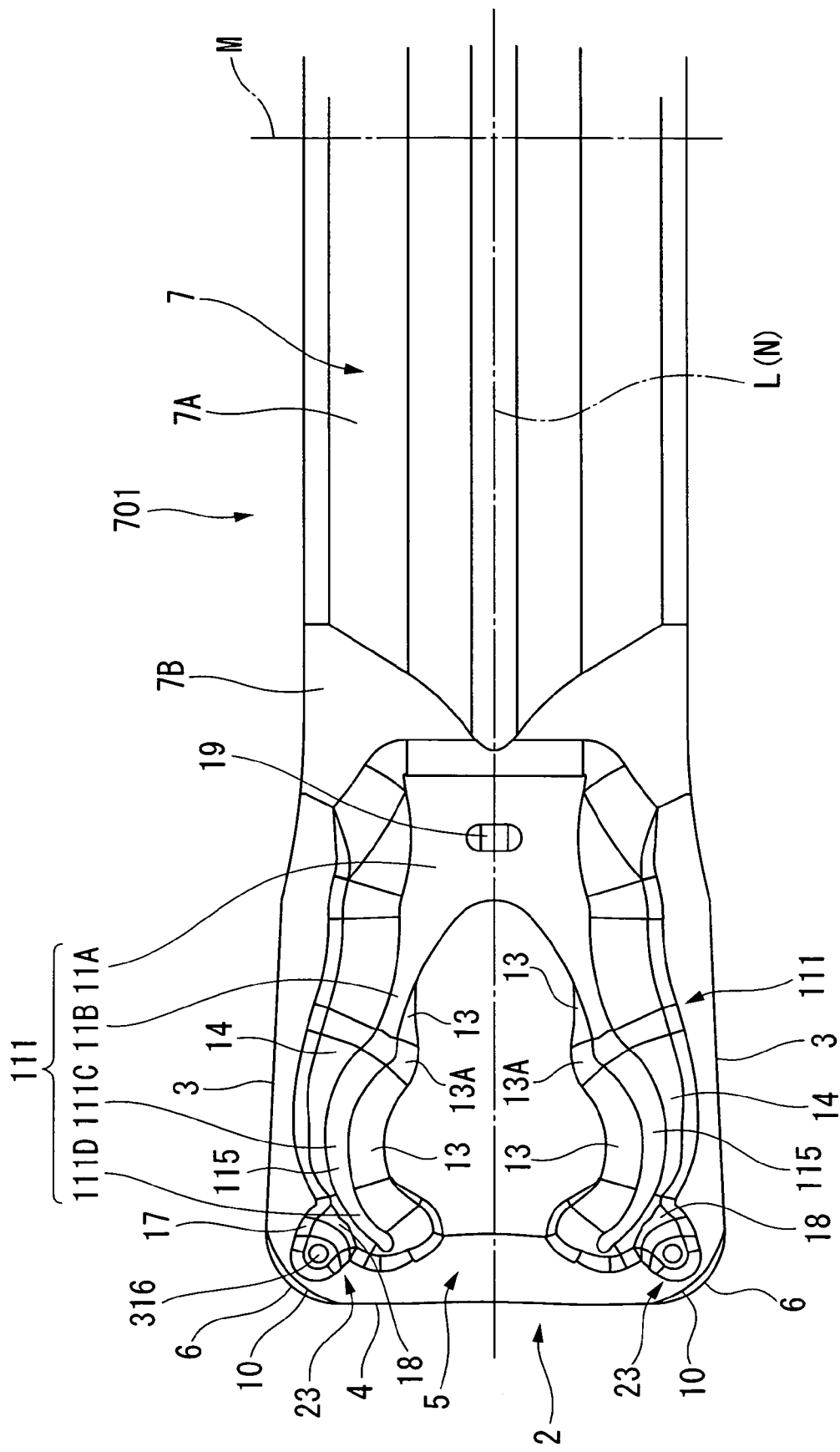
FIG. 16 is an enlarged plan view showing a cutting edge portion 2 of a modified embodiment of the fourth embodiment as seen from a direction facing a rake face 5 perpendicular to a longitudinal direction of a cutting insert.

Furthermore, if a cutting insert is used only for the grooving or cutting-off of work material and not used for broadening a groove width, the cutting insert can be provided with a truncated conical projection 23 or a spherical projection which is not deviated from in shape at each of the spaces between the first front end portions 11D of the protruded streaks 11 and the corner portions 6 as in an insert body 301 according to a fourth embodiment of the present invention shown in FIG. 12. In this case, the distance between the projection 23 and the first front end portion 11D or the corner portion 6 is broad; therefore, the amount of cutting fluid supplied to the front cutting edge 4 can be increased, thereby improving the efficiency of the lubrication and coolant. Note, in the second to fourth embodiments shown in FIGS. 10 to 12, the portions that the same as those of the first embodiment, except for the projections 21 to 23 and the like, are denoted by the same reference symbols and the descriptions thereof are omitted.

In the first embodiment and the second to fourth embodiments, the second front end portion 11C of the protruded streak 11 is formed so that the inner wall face 13 has a recessed curved shape and the outer wall face 14 has a protruded curved shape with respect to the side cutting edge 3 adjacent to the protruded streak 11. Chips generated at the front cutting edge 4 by grooving or cutting-off by feeding the insert body 1, 101, 201, 301 in the axis L direction can be fractured by the inner wall faces 13 of the pair of the protruded streaks 11 facing each other as mentioned above. In addition, chips generated at the side cutting edge 3 when broadening groove width can be disposed by the outer walls 14 and the projections 12, or 21 to 23.

In addition, even when broadening the groove width, there is a case in which the flowing direction of the chips is varied so that the chips also flow out toward the front end of the cutting edge portion 2 along with the chips approaching inside in the width direction of the insert body 1, 101, 201, 301, for example, when the insert body 1, 101, 201, 301 is fed in the width direction while receding in order to form an inclined wall face of a groove. In this case, the outer wall face 14 always faces to the flowing direction of the chips since it has a protruded curved face. Accordingly, the chips are stably collided with the outer wall face 14 and can be reliably disposed.

Furthermore, in the first to fourth embodiments, the outer wall face 14 is the protruded curved face as seen in the plan view; and the outer wall face 14 of the second rear end portion 11B is the recessed curved face with respect to the side cutting edge 3 adjacent thereto. Therefore, a large space can be obtained between the side cutting edge 3 and the protruded streak 11 at the second rear end portion 11B. In addition, flowing thorough the large space, a large amount of the cutting fluid can be supplied toward the recessed portion 18 between the protruded streak 11 and the projections 12, and 21 to 23 at the front of the cutting edge portion 2. As a result, according to these embodiments, the cutting fluid can be supplied more reliably to the front cutting edge 4, especially to the corner portion 6, thereby realizing an efficient lubrication and coolant.

In the first to fourth embodiments, the protruded end face 15 of the protruded streak 11 at the first front end portion 11D is formed so that a portion which is located on a bisector of the corner portion 6 as seen in the plan view is slightly protruded toward the corner portion 6 and widened. However, the protruded end face 5 or the protruded streak 11 itself may be gradually narrowed approaching the front or extend in a constant width at least in the first front end portion 11D or in an area including the first front end portion 11D to the second front end portion 11C.

FIGS. 13 to 16 show insert bodies 401, 501, 601,701 of modified embodiments of the first to fourth embodiments in which the width of the protruded end face 115 is tapered toward the front within an area the first front end portion 111D to the second front end portion 111C. The protruded end face 15 or the protruded streak 111 is formed so that the first front end portion 111D does not have a broad portion; therefore, a larger space between the protruded streak 111 and the projection 12, or 21 to 23 can be obtained. Accordingly, a large amount of the cutting fluid can be supplied to the front and flow smoothly; thereby improving the efficient supply thereof.

However, even if the width of the protruded end face 115 of the protruded streak 111 at the first front end portion 111D is tapered toward the front or is constant, the projection 12 is smaller than the protruded streak 111. That is, if a protruded end face 16, 116 of the projection 12, 21 is an oval shape as the modified embodiments shown in FIGS. 13 and 14, width of the protruded end face 16, 116 in a minor axis direction of the oval is substantially the same as or smaller than that of the protruded end face of the protruded streak 111 at the first front end portion 111D; and the length of the protruded end face 16, 116 in a longitudinal direction of the oval is smaller than that of the protruded end face 115. Further, if the projection 22, 23 has a truncated conical shape or a spherical shape and the protruded end face 216, 316 is circular as the modified embodiments show in FIGS. 15 and 16, a diameter of the circular protruded end face 216, 316 is substantially the same as or smaller than the width of the protruded end face 115 of the protruded streak 111 at the first front end portion 111D.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A cutting insert comprising:
an insert body formed in a shaft-shape;
a cutting edge portion that is formed on a front end portion of the insert body and has a square rake face;
a pair of side cutting edges that are formed along both sides of the rake face and extend in a longitudinal direction of the insert body;
a front cutting edge that is formed along the front end of the rake face between each of front ends of the side cutting edges and extends in a transverse direction perpendicular to the longitudinal direction; and
a pair of protruded streaks that are formed on the rake face and extend toward each of corner portions at which each of the side cutting edges intersects the front cutting edge; and
a pair of projections which are each formed on the rake face between a front end of the protruded streak and the corner portion so as to be separated from the protruded streak.

2. The cutting insert according to claim 1, wherein each of the projections extends from the vicinity of the front end of the protruded streak toward the corner portion.

3. The cutting insert according to claim 2, wherein each of the projections extends so as to intersect an axis of the longitudinal direction in 15° and 75° seen in a direction facing the rake face perpendicular to the longitudinal direction.

4. The cutting insert according to claim 1, wherein a plurality of projections are provided between each of the front ends of the protruded streaks and each corner portion, so as to be separated from each other.

5. The cutting insert according to claim 1, wherein each of the protruded streaks includes an outer wall face having a protruded curved face which faces the adjacent side cutting edge and protrudes toward the side cutting edge as seen in a direction facing the rake face and perpendicular to the longitudinal direction.

6. The cutting insert according to claim 5, wherein the outer wall face is a protruded curved face which gradually approaches to and separates from the side cutting edge from a front toward a rear of the adjacent side cutting edge as seen in the direction facing the rake face and perpendicular to the longitudinal direction.

7. The cutting insert according to claim 5, wherein the outer wall face has a circular arc shape as seen in the direction facing the rake face and perpendicular to the longitudinal direction.

8. The cutting insert according to claim 6, wherein the outer wall face has a circular arc shape as seen in the direction facing the rake face and perpendicular to the longitudinal direction.

9. The cutting insert according to claim 5, wherein each of the protruded streaks is formed so that the outer wall face at a front end thereof has a protruded curved shape, and at a rear end thereof has a recessed curved face with respect to the adjacent side cutting edge as seen in the direction facing the rake face and perpendicular to the longitudinal direction.

10. The cutting insert according to claim 6, wherein each of the protruded streaks is formed so that the outer wall face at a front end thereof has a protruded curved shape, and at a rear end thereof has a recessed curved face with respect to the adjacent side cutting edge as seen in the direction facing the rake face and perpendicular to the longitudinal direction.

11. The cutting insert according to claim 7, wherein each of the protruded streaks is formed so that the outer wall face at a front end thereof has a protruded curved shape, and at a rear end thereof has a recessed curved face with respect to the adjacent side cutting edge as seen in the direction facing the rake face and perpendicular to the longitudinal direction.

12. The cutting insert according to claim 8, wherein each of the protruded streaks is formed so that the outer wall face at a front end thereof has a protruded curved shape, and at a rear end thereof has a recessed curved face with respect to the adjacent side cutting edge as seen in the direction facing the rake face and perpendicular to the longitudinal direction.

* * * * *